United States Patent
Bernstein et al.

[15] 3,687,960
[45] Aug. 29, 1972

[54] 8-FLUORO-2-SUBSTITUTED-GAMMA-CARBOLINE

[72] Inventors: Edith Bernstein; David Lyon Garmaise, both of Montreal, Canada; Nicholas Peter Plotnikoff, Lake Bluff, Ill.

[73] Assignee: Abbott Laboratories, North Chicago, Ill.

[22] Filed: April 21, 1971

[21] Appl. No.: 136,194

[52] U.S. Cl. .....260/295 S, 260/296 A, 260/294.8 B, 424/263, 424/266
[51] Int. Cl. ...........................................C07d 31/42
[58] Field of Search......................260/295 S, 296 A

[56] References Cited

UNITED STATES PATENTS

| | | |
|---|---|---|
| 3,382,250 | 5/1968 | Johnson et al.........260/296 A |
| 3,448,114 | 6/1969 | Johnson et al.........260/296 A |
| 3,466,293 | 9/1969 | Johnson et al..........260/294.9 |

*Primary Examiner*—Alan L. Rotman
*Attorney*—Robert L. Niblack

[57] ABSTRACT

2-(3-Hydroxypropyl)-8-fluoro-1,2,3,4-tetrahydro-5H-pyrido[4,3-b]indole has been found to be a powerful anti-depressant when administered to warm-blooded animals.

1 Claim, No Drawings

8-FLUORO-2-SUBSTITUTED-GAMMA-CARBOLINE

DETAILED DESCRIPTION OF THE INVENTION 2-(3-hydroxpropyl)-8-fluoro-1, 2, 3, 4-tetrahydro-5H-pyrido[4, 3-b]indole, more commonly and herein below simply referred to as 2-(3-hydroxypropyl)-8-fluoro-γ-carboline has been discovered to have strong anti-depressant activity at a dose representing only a small fraction of an amount that would show any toxic manifestations. The above compound shows an oral LD50 in mice of >1000 mg./kg. and an intraperitoneal LD50 of 750 mg./kg. while strong anti-depressant effects are observed with < 25 mg./kg. by oral administration.

The new compound is generally prepared by heating a stirred mixture of 8-fluoro-2-carboline hydrochloride in an inert solvent with a 3-hydroxypropyl halide and an acid acceptor. If desired, a catalyst may be used. The reaction mixture is evaporated after condensation has been effected and the residue taken up in a suitable, preferably water-immiscible solvent, washed with water and recovered and recrystallized from ethyl acetate or acetone.

As an illustration but without intention to limit the present invention, the following detailed example is given:

EXAMPLE 8-fluoro-γ-carboline 18.1 g. (0.08 moles) and 13.9 g. of 3-hydroxypropyl bromide (0.1 mole) were stirred and heated at 75°–80° C. in 250 ml. of dimethylformamide with 22.08 g. of anhydrous potassium carbonate (0.16 moles) and 13.28 g. of potassium iodide. After 7 hours, the solvent was evaporated and the residue taken up in 300 ml. of chloroform and 200 ml. of water. The chloroform layer was separated, washed again with water, dried over magnesium sulfate and evaporated under reduced pressure. The brown residue was recrystallized from ethyl acetate, yielding 4 g. of 2-(3-hydroxypropyl)-8-fluro-γ-carboline. An analytically pure sample was obtained by further recrystallization from acetone; it melted at 136.5°–137.5° C.

The anti-depressant activity of this compound was measured by the method of G. Everett, described in Excerptia Int. Congress, Series 122, page 164–7. This test is commonly referred to as "modified DOPA-test" and uses an activity scale of 1–3 with activity 3 signifying a pronounced anti-depressant effect. The compound described shows activity 3 at an oral dose of 25 mg./kg. in mice after 4 hours and an activity 1 reading after 8 hours; at 100 mg./kg. the test after 4 hours shows the maximum level and activity 2 after 8 hours.

The discovery of this activity is quite surprising since derivatives of the above compound such as aliphatic esters, inorganic esters such as the methylsulfonate are orally inactive in the modified DOPA-test. However, acid addition salts of the above compound are equally useful, particularly the non-toxic salts such as the hydrochloride, sulfate, phosphate, succinate, acetate, citrate and tartrate.

We claim:

1. 2-(3-hydroxypropyl)-8-fluoro-1,2,3,4-tetrahydro-5H-pyrido[4,3-b]indole or a non-toxic acid addition salt thereof.

* * * * *